United States Patent [19]

Musch et al.

[11] Patent Number: 5,187,232

[45] Date of Patent: Feb. 16, 1993

[54] RUBBER COMPOUNDS OF POLYCHLOROPRENE AND HYDROGENATED NITRILE RUBBER

[75] Inventors: Rüdiger Musch, Bergisch Gladbach; Joachim Thörmer, Leverkusen; Hartmuth Buding, Dormagen; Friedrich Leibbrandt, Kuerten-Busch, all of Fed. Rep. of Germany

[73] Assignee: Bayer Aktiengesellschaft, Leverkusen-Bayerwerk, Fed. Rep. of Germany

[21] Appl. No.: 594,624

[22] Filed: Oct. 9, 1990

[30] Foreign Application Priority Data

Oct. 20, 1989 [DE] Fed. Rep. of Germany ....... 3934954

[51] Int. Cl.⁵ ..................... C08L 11/00; C08L 27/04; C08L 27/00
[52] U.S. Cl. ..................... 525/215; 525/214; 525/213; 525/191
[58] Field of Search .......................... 525/215

[56] References Cited

U.S. PATENT DOCUMENTS

| | | | |
|---|---|---|---|
| 3,943,192 | 3/1976 | Courtland | 525/215 |
| 4,048,261 | 9/1977 | Starmer | 525/187 |
| 4,383,072 | 5/1983 | Thiel et al. | 525/133 |
| 4,404,329 | 9/1983 | Maeda | 525/329.2 |
| 4,857,591 | 8/1989 | Eichenauer et al. | 525/77 |

FOREIGN PATENT DOCUMENTS

| | | | |
|---|---|---|---|
| 0527552 | 7/1956 | Canada | 525/215 |
| 0849610 | 3/1968 | Canada | 525/215 |
| 0270020 | 6/1988 | European Pat. Off. . | |
| 1910770 | 3/1969 | Fed. Rep. of Germany . | |
| 45-039357 | 12/1970 | Japan | 525/215 |
| 59-213743 | 5/1983 | Japan | 525/215 |

OTHER PUBLICATIONS

Database WPIL, 90-080361, Derwent Publications Ltd., (1990).
Database WPIL, 983-831942, Derwent Publications Ltd., (1983).

Primary Examiner—Ana L. Carrillo
Assistant Examiner—W. R. H. Clark
Attorney, Agent, or Firm—Connolly & Hutz

[57] ABSTRACT

Mixtures of polychloroprene and hydrogenated nitrile rubber give vulcanizates combining high modulus with a high dynamic stress absorption capacity.

2 Claims, 1 Drawing Sheet

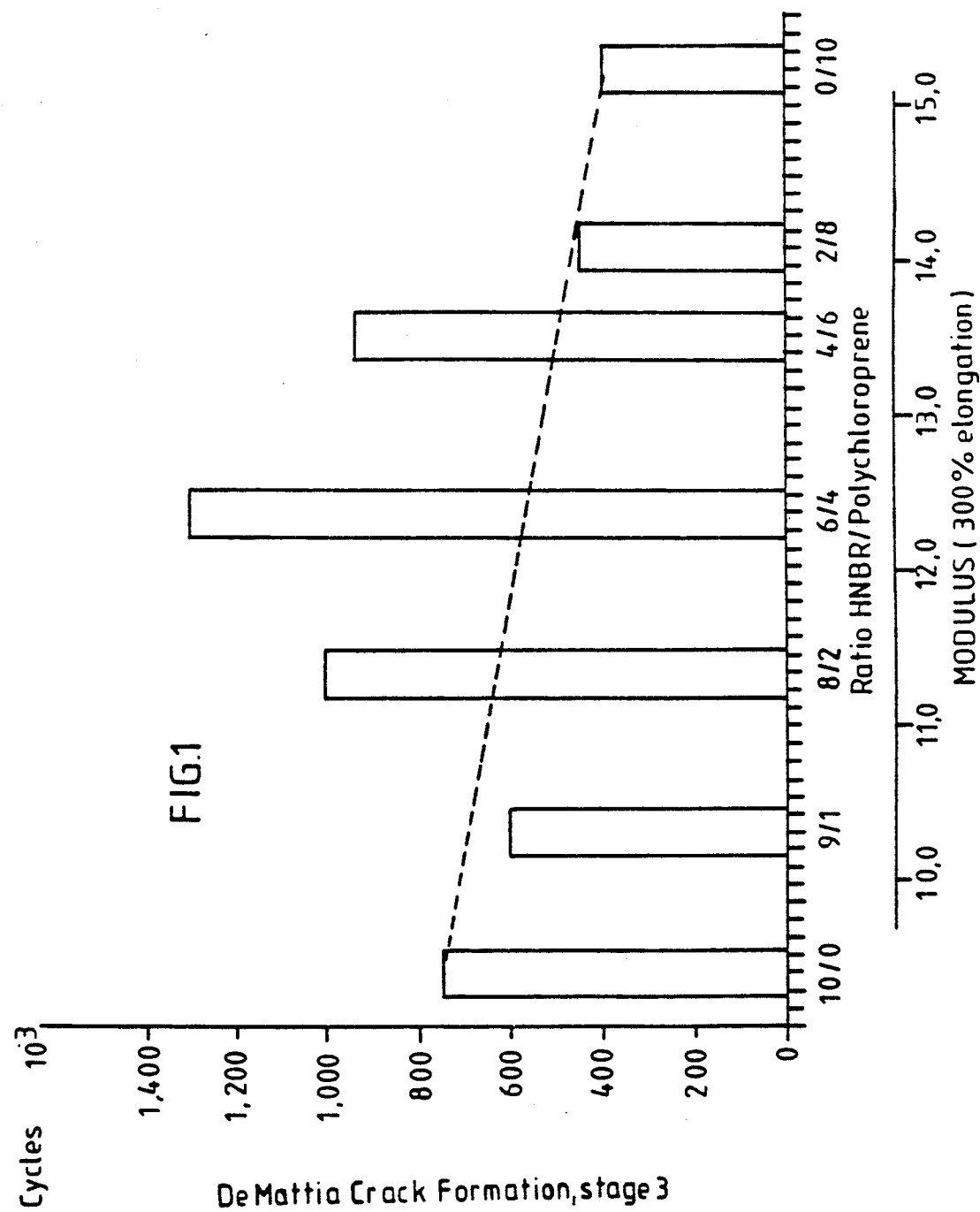

RUBBER COMPOUNDS OF POLYCHLOROPRENE AND HYDROGENATED NITRILE RUBBER

This invention relates to vulcanizable rubber compounds containing polychloroprene and hydrogenated nitrile rubber (hereinafter referred to as "HNBR") and to the vulcanizates of these compounds. The vulcanizates are distinguished by their ability to withstand high dynamic stressing.

In the context of the invention, the expression "hydrogenated nitrile rubber" or "HNBR" is intended to encompass nitrile rubbers of which the C=C double bonds are selectively hydrogenated (i.e. without hydrogenation of the C≡N triple bond) either completely or in part.

Hydrogenated nitrile rubber is distinguished by high ultimate tensile strengths, low abrasion, minimal permanent deformation after compressive and tensile stressing and high oil resistance, but above all by remarkable stability to thermal and oxidative influences.

For many applications, a very important property is the modulus of a vulcanizate, i.e. the force required for a certain deformation (for example 300% elongation). The modulus increases with the number of crosslinkages in the vulcanizate. The dynamic stress-absorbing capacity of vulcanizates, as expressed for example by the number of cycles in the folding endurance test, normally decreases with increasing modulus, so that a decision generally has to be made as to which of the two properties is to be given priority over the other.

It has now surprisingly been found that the dynamic stress-absorbing capacity of vulcanizates of polychloroprene/HNBR compounds does not obey this empiricism, but instead passes through a maximum. The knowledge of this phenomenon makes it possible to provide vulcanizates having a fortunate combination of high modulus and high dynamic stress-absorbing capacity.

Accordingly, the present invention relates to compounds of
A) 15 to 70% by weight and preferably 20 to 60% by weight polychloroprene and
B) 85 to 30% by weight and preferably 80 to 40% by weight hydrogenated nitrile rubber, the percentages being based on the sum of components A) +B).

The present invention also relates to the vulcanizates of these compounds.

Suitable polychloroprenes A are chloroprene polymers which, in addition to polymerized 2-chloroprene units, may contain 0.05 to 30% by weight and preferably 0.1 to 20% by weight, based on chloroprene polymer, of copolymerized units of other ethylenically unsaturated monomers or sulfur, i.e. polychloroprenes of the type described, for example, in "Methoden der Organischen Chemie" (Houben-Weyl), Vol. E20/2, 842-859, Georg Thieme Verlag, Stuttgart - New York 1987.

They generally have Mooney viscosities (according to DIN 53 523) of 5 to 140 and preferably 20 to 120 (ML 1+4)/ 100° C. and glass transition temperatures below −25° C.

Preferred ethylenically unsaturated "other monomers" copolymerizable with chloroprene are, essentially, 2,3-dichlorobutadiene and 1-chlorobutadiene. Sulfur-modified polychloroprenes A are preferred.

The quantity of elemental sulfur used for the production of sulfur-modified polychloroprene is from 0.05 to 1.5% by weight and preferably from 0.1 to 1% by weight, based on the monomers used. Where sulfur donors are used, the quantity in which they are used has to be gauged in such a way that the sulfur released corresponds to the quantities mentioned above.

The polychloroprenes A may be uncrosslinked, i.e. soluble in toluene, or crosslinked. Crosslinking may be obtained by increased monomer conversion or by addition of crosslinking monomers during the polymerization.

The polychloroprenes A may be produced in known manner, for example by emulsion polymerization at 0° to 70° C. and preferably at 5° to 50° C.

To regulate their viscosity, the polychloroprenes A may be produced in the presence of typical chain transfer agents, such as mercaptans, as described for example in DE-OS 30 02 711, GB-PS 1,048,235, FR-PS 2 073 106, or xanthogen disulfides, as described for example in DE-AS 1 186 215, in DE-OSS 21 56 453, 23 06 610 and 30 44 811, in EP-PS 53 319, in GB-PSS 512,458 and 952,156 and in US-PSS 2,321,693 and 2,567,117.

In the case of sulfur-modified polychloroprenes A, the desired viscosity may be established by using typical peptizing agents, for example of the type described in DE-OSS 1 911 439, 2 018 736, 2 755 074 and 3 246 748, in DE-PS 2 645 920, in EP-A 21 212 and 200 857, in FR-PS 1 457 004 and in US-PSS 2,264,713, 3,378,538, 3,397,173 and 3,507,825.

The polychloroprenes A may of course also consist of mixtures of various chloroprene polymers.

Preferred hydrogenated nitrile rubbers B are those having a degree of hydrogenation, based on the C=C double bonds emanating from the butadiene, of at least 80%, preferably of at least 95% and, more preferably, of at least 98%. The degree of hydrogenation may be determined by IR spectroscopy; cf. D. Brück in Kautschuk, Gummi, Kunststoffe 42. No. 2, pages 107–110 (1989).

The hydrogenated nitrile rubbers B are based on butadiene/acrylonitrile copolymers containing 5 to 60% by weight and preferably 10 to 50% by weight copolymerized acrylonitrile.

The hydrogenated nitrile rubbers B generally have Mooney viscosities (DIN 53 523) of 10 to 150 and preferably 25 to 90 (ML 1+4)100° C.

Components A) and B) may be mixed in typical mixing units. Preferred mixing units are the kneaders, mixing rolls, internal mixers and mixing extruders typically used in the rubber industry which generally operate with shear rates of 1 to 1,000 sec$^{-1}$ and preferably 1 to 200 sec$^{-1}$.

Typical fillers and auxiliaries, such as for example plasticizers, resins, factices and stabilizers, may be added to the compounds according to the invention to obtain certain crude rubber or vulcanizate properties.

For most applications, the compounds according to the invention are used in vulcanized form. Vulcanization may be carried out, for example, by high-energy radiation or by crosslinking with sulfur or sulfur donors, with peroxides and/or with polyfunctional crosslinking compounds (such as for example triallyl cyanurate, triallyl isocyanurate, bismaleic imides or divinylbenzene), optionally after addition of fillers, stabilizers, etc. Sulfur and peroxide vulcanization are preferred.

Detailed descriptions of sulfur vulcanizing systems can be found in W. Hofmann, "Vulkanisation und Vulkanisationshilfsmittel", Verlag Berliner Union GmbH, Stuttgart 1965, and in Alliger and Sjothun, "Vulcanization of Elastomers", Reinhold Pub. Corp. New York 1964. Suitable sulfur donors include thiuram polysulfides, such as for example dipentamethylene thiuram tetrasulfide and hexasulfide, tetramethyl thiuram disulfide; amine disulfides, such as dimorpholyl disulfide for example; sodium polysulfides and thioplasts.

Preferred sulfur vulcanizing systems contain
a) sulfur or sulfur donors,
b) optionally vulcanization accelerators and
c) optionally one or more activators.

a) is generally used in a quantity of 0.2 to 3.0% by weight sulfur (in the case of sulfur donors: expressed as he sulfur released), based on rubber. Sulfur-modified polychloroprene may also serve as a sulfur donor.

The vulcanization accelerator b) is generally used in quantities of 1 to 3.5% by weight, based on rubber. Preferred vulcanization accelerators b) include thiazole accelerators, such as 2-mercaptobenzothiazole, dibenzothiazyl disulfide, benzothiazyl-2-cyclohexylsulfenamide (CBS), benzothiazyl-2-tert.-butylsulfenamide (TBBS), N-morpholinothio-2-benzothiazole (MBS), benzothiazyl-2-diisopropylsulfenamide (DIBS), benzothiazyl-2-tert.-amylsulfenamide (AMZ), benzothiazyl dicyclohexylsulfenamide (DCBS) and morpholinothiocarbonyl sulfenmorpholide (OTOS).

Other preferred vulcanization accelerators b) include diphenyl guanidine (DPG) and di-o-tolyl guanidine (DOTG); thiurams, such as thiuram mono- and disulfides; and dithiocarbamates, such as thiophosphates and derivatives and salts thereof, for example zinc salts.

The most important activators c) are the metal oxides, particularly zinc oxide. In individual cases, magnesium oxide or calcium hydroxide is also used.

Preferred peroxides for peroxide vulcanization include dialkyl peroxides, ketal peroxides, aralkyl peroxides, peroxide esters, peroxide ethers; for example di-tert.-butyl peroxide,bis-(tert.-butylperoxyisopropyl)-benzene,dicumyl peroxide, 2,5-dimethyl-2,5-di-(tert.-butylperoxy)-hexane, 2,5-dimethyl-2,5-di-(tert.-butylperoxy)-3-hexene, 1,1-bis(tert.-butylperoxy) -3,3,5-trimethyl cyclohexane, benzoyl peroxide, tert.-butyl cumyl peroxide and tert.-butyl perbenzoate.

The peroxides are preferably used in quantities of 4 to 8% by weight, based on rubber.

The vulcanization may be carried out at temperatures of 100° to 200° C. and preferably at temperatures of 130 to 180° C., optionally under a pressure of 10 to 200 bar. After vulcanization, the vulcanizates may be conditioned by storage at relatively high temperatures.

"Vulcanized" in the context of the invention means that less than 10% by weight and preferably less than 5% by weight, based on the sum of components A) and B), can be extracted during extraction in a Soxhlet using tetrahydrofuran (10 hours) followed by chlorobenzene (10 hours) as the extractant.

The rubber compounds according to the invention are distinguished inter alia by excellent flow and by improved safety during processing (extended Mooney scorch times).

The rubber compounds according to the invention are particularly suitable for the production of vulcanizates which have to be capable of withstanding high dynamic stressing: seals, hoses, membranes, drive belts, gaskets, cable sheaths, etc.

In the following Examples, parts and percentages are by weight.

EXAMPLES

Starting products

HNBR 1

A product produced by hydrogenation from a nitrile rubber containing 34% copolymerized acrylonitrile: degree of hydrogenation of the C=C double bonds 95.7%, Mooney viscosity 60 (ML 1+4) 100° C. (®Therban 1706 S, a product of Bayer AG).

Polychloroprene 2

Sulfur-modified product obtained as follows:

An aqueous phase consisting of 120 parts deionized water, 3.25 parts unmodified resinic acid based on wood resin, 0.9 part potassium hydroxide, 0.7 part of the Na salt of the condensate of naphthalenesulfonic acid and formaldehyde and 0.03 part of the Na salt of anthraquinone β-sulfonic acid was introduced into a 20 liter flask, purged with nitrogen and heated to 40° C. 100 Parts nitrogen-purged chloroprene were then introduced. After a temperature of 40° C. had been established, 0.3 part sulfur (50% aqueous dispersion) was added. 0.9 Part Na dibutyl dithiocarbamate (30% aqueous solution) was then added.

The polymerization reaction was activated by addition of 0.03 part $K_2S_2O_8$ in the form of a nitrogen-purged 4% aqueous $K_2S_2O_8$ solution. $2.25 \cdot 10^{-3}$ parts $K_2S_2O_8$ per minute were introduced during the test in the form of this aqueous nitrogen-purged persulfate solution.

The course of the polymerization was followed gravimetrically from samples taken during polymerization. Polymerization was stopped at a monomer conversion of 66% by addition of 0.03 part, based on latex, of a 2.5% solution of diethyl hydroxylamine and 1.0 part tetraethyl thiuram disulfide (TETD) in the form of an emulsion in toluene was added to the latex.

The latex was degassed to approx. 500 ppm residual chloroprene (based on latex), the degassed latex was adjusted to pH 6 with 20% acetic acid, the polymer was isolated by low-temperature coagulation, washed with deionized water and dried to a residual moisture content of ≦0.5%. The polymer had a Mooney viscosity of 44 (ML 1+4) 100° C.

| Formulations and production of compounds |||||||||
| --- | --- | --- | --- | --- | --- | --- | --- | --- |
| Examples | 1* | 2* | 3 | 4 | 5 | 6* | 7* | 8* |
| HNBR 1 | 100 | 90 | 80 | 60 | 40 | 20 | 10 | — |
| Polychloroprene 2 | — | 10 | 20 | 40 | 60 | 80 | 90 | 100 |
| I  Zinc oxide | 5 | The individual quantities are ||||| 5 |
| Magnesium oxide | 4 | reflected in the blending ratios ||||| 4 |
| Stearic acid | 1 | |||||| 1 |
| Octylated diphenylamine | 2 | |||||| 2 |
| Carbon black N 762 | 60 | |||||| 60 |
| Dispersion aid | 2 | |||||| 2 |
| TOTM | 10 | |||||| 10 |
| TMTD | 2 | 1.9 | 1.8 | 1.6 | 1.4 | 1.2 | 1.1 | 1 |
| CBS | 0.5 | 0.45 | 0.4 | 0.3 | 0.2 | 0.1 | 0.05 | — |
| II  Sulfur | 0.5 | 0.45 | 0.4 | 0.3 | 0.2 | 0.1 | 0.05 | — |

Chemicals used

Magnesium oxide: ® Maglite DE, a product of Merck & Co. Inc., USA

Octylated diphenylamine: ® Vulkanox OCD, a product of Bayer AG, Leverkusen

-continued

| | |
|---|---|
| Carbon black N 762: | ® Regal, a product of Cabot GmbH, Hanau |
| Dispersion aid: | ® Aflux 42, a product of Rhein-Chemie, Rheinau |
| TOTM: | plasticizer ® Witamol 218, a product of Dynamit Nobel |
| Zinc oxide: | ® Zinkoxyd aktiv, a product of Bayer AG, Leverkusen |
| TMTD: | ® Vulkacit Thiuram, a product of Bayer AG, Leverkusen |
| CBS: | ® Vulkacit CZ, a product of Bayer AG, Leverkusen |
| ETU: | ® Vulkacit NPV/C, a product of Bayer AG, Leverkusen |
| Sulfur: | ® Rhenocure JS 60/5, a product of Rhein-Chemie, Rheinau |

| | Mixing sequence | |
|---|---|---|
| Compound 1: | rubber | 1 min. |
| | fillers + constituents I + II | 4 mins. |
| | complete cooling | 5 mins. |
| | TMTD and CBS, empty | 6 mins. |

*Comparison Examples
Compounds 1 and 8 were prepared in a laboratory kneader which was heated to 50° C. (cooling water) in the case of compound 1 and 30° C. in the case of compound 8.

The TMTD and CBS were added at a melt temperature of approx. 100° C.

| | Mixing sequence | |
|---|---|---|
| Compound 8: | rubber | 0.5 min. |
| | all except zinc oxide and TMTD | 1.5 mins. |
| | zinc oxide | 2 mins. |
| | empty; add TMTD on laboratory mixing rolls at a melt temperature of approx. 95° C. | | empty; add TMTD on laboratory mixing rolls at a melt temperature of approx. 95° C.

In Examples 2 to 7, the corresponding quantities of compounds I and 8 were blended on laboratory mixing rolls.

Dynamic Behavior and Brief Description of Drawing
(De-Mattia determination of crack formation)

The folding endurance test using a De-Mattia machine was carried out in accordance with DIN 53 522. The number of cycles to crack formation for the stages shown in the standard was evaluated. The numbers of cycles of all the stages was then averaged.

The results are shown in FIG. 1.

I claim:
1. Compositions containing
   A) 20 to 60% by weight polychloroprene and
   B) 80 to 40% by weight hydrogenated nitrile rubber having a degree of hydrogenation of at least 95%.
2. Vulcanizates of the compositions claimed in claim 1.

* * * * *